(12) United States Patent
Van Kampen (10) Patent No.: US 12,476,062 B2
(45) Date of Patent: Nov. 18, 2025

(54) MEMS SWITCH WITH BEAM CONTACT PORTION CONTINUOUSLY EXTENDING BETWEEN INPUT AND OUTPUT TERMINAL ELECTRODES

(71) Applicant: Qorvo US, Inc., Greensboro, NC (US)

(72) Inventor: Robertus Petrus Van Kampen, S-Hertogenbosch (NL)

(73) Assignee: Qorvo US, Inc., Greensboro, NC (US)

( * ) Notice: Subject to any disclaimer, the term of this patent is extended or adjusted under 35 U.S.C. 154(b) by 0 days.

(21) Appl. No.: 18/670,989

(22) Filed: May 22, 2024

(65) Prior Publication Data

US 2024/0412935 A1 Dec. 12, 2024

Related U.S. Application Data

(63) Continuation of application No. 17/199,731, filed on Mar. 12, 2021, now abandoned.

(51) Int. Cl.
*H01H 59/00* (2006.01)
(52) U.S. Cl.
CPC . *H01H 59/0009* (2013.01); *H01H 2059/0027* (2013.01); *H01H 2059/0036* (2013.01)
(58) Field of Classification Search
None
See application file for complete search history.

(56) References Cited

U.S. PATENT DOCUMENTS 6,307,452 B1 10/2001 Sun
6,850,133 B2 * 2/2005 Ma ..................... H01H 59/0009
335/78

(Continued)

FOREIGN PATENT DOCUMENTS

CN 108352275 A * 7/2018 ......... H01H 59/0009
CN 109983556 A * 7/2019 ........... H01H 9/0009
(Continued)

OTHER PUBLICATIONS

Bacon, P. et al., "Overview of RF Switch Technology and Applications," Microwave Journal, vol. 57, Issue 7, Jul. 15, 2014, pp. 76-88.
Carty, E. et al., "Development of a DC to K-Band Ultra Long On-Life RF MEMS Switch with Integrated Driver Circuitry," Proceedings of the 11th European Microwave Integrated Circuits Conference (EuMA), Oct. 3-4, 2016, London, UK, pp. 1373-1376.
Maciel, J. et al., "Rugged and Reliable Ohmic MEMS Switches," 2012 IEEE/MTT-S International Microwave Symposium Digest, Jun. 17-22, 2012, Montreal, QC, Canada, IEEE, 3 pages.
(Continued)

*Primary Examiner* — Bernard Rojas
(74) *Attorney, Agent, or Firm* — Withrow & Terranova, P.L.L.C.

(57) ABSTRACT

Embodiments of the disclosure are directed to microelectromechanical system (MEMS) switches with a beam contact portion continuously extending between input and output terminal electrodes. In exemplary aspects disclosed herein, the movable beam includes a body and a contact with more conductivity and stiffness than the body. The contact continuously extends between and electrically couples the contact of the movable beam with the input and output terminal electrodes. Differing materials between the body and the contact allow for inclusion of the mechanical properties of the body (e.g., to reduce mechanical fatigue, creep, etc.) while utilizing the electrical properties of the contact (e.g., to reduce on-state electrical resistance). Accordingly, the MEMS switch provides low resistance loss during an on-state while maintaining high levels of isolation during an off-state.

20 Claims, 9 Drawing Sheets

(56) References Cited

U.S. PATENT DOCUMENTS

| | | | |
|---|---|---|---|
| 7,663,456 | B2 | 2/2010 | Subramanian et al. |
| 2003/0146079 | A1 | 8/2003 | Goldsmith |
| 2003/0227361 | A1 | 12/2003 | Dickens et al. |
| 2005/0007219 | A1 | 1/2005 | Ma et al. |
| 2012/0068278 | A1 | 3/2012 | Knipe et al. |
| 2015/0311003 | A1 | 10/2015 | Fitzgerald et al. |
| 2016/0207763 | A1* | 7/2016 | Troy ................. H01G 5/16 |
| 2018/0315571 | A1* | 11/2018 | Van Kampen ........ B81B 3/0035 |
| 2018/0315748 | A1* | 11/2018 | Gaddi ................. H01L 27/0296 |
| 2019/0066957 | A1* | 2/2019 | Van Kampen ..... H01H 59/0009 |
| 2020/0343067 | A1 | 10/2020 | Schepens et al. |
| 2020/0399115 | A1 | 12/2020 | Van Kampen et al. |
| 2021/0017017 | A1 | 1/2021 | Gudeman et al. |
| 2022/0293382 | A1 | 9/2022 | Van Kampen |

FOREIGN PATENT DOCUMENTS

| | | | |
|---|---|---|---|
| DE | 10031569 | A1 | 2/2001 |
| EP | 1429413 | A1 | 6/2004 |
| NL | 2015196 | A | 7/2016 |
| WO | 2014165624 | A1 | 10/2014 |
| WO | 2015017743 | A1 | 2/2015 |
| WO | 2018063814 | A1 | 4/2018 |

OTHER PUBLICATIONS

Rebeiz, G. et al., "RF MEMS Switches and Switch Circuits," IEEE Microwave Magazine, vol. 2, No. 4, Dec. 2001, IEEE, pp. 59-71.
Segueni, K. et al., "A Totally Free Flexible Membrane: A Design for Low Electrostatic Actuation MEMS," The 14th International Conference on Solid-State Sensors, Actuators and Microsystems, Jun. 10-14, 2007, Lyon, France, IEEE, pp. 461-464.
Non-Final Office Action for U.S. Appl. No. 17/199,731, mailed Aug. 18, 2022, 12 pages.
Non-Final Office Action for U.S. Appl. No. 17/199,731, mailed Apr. 26, 2023, 20 pages.
Final Office Action for U.S. Appl. No. 17/199,731, mailed Aug. 3, 2023, 17 pages.
Non-Final Office Action for U.S. Appl. No. 17/199,731, mailed Nov. 22, 2023, 18 pages.
Notice of Allowance for U.S. Appl. No. 17/199,731, mailed Feb. 29, 2024, 10 pages.
Extended European Search Report for European Patent Application No. 22155608.7, mailed Jul. 21, 2022, 8 pages.
Office Action for Taiwanese Patent Application No. 111106725, mailed Jun. 26, 2025, 27 pages.

\* cited by examiner

MEMS SWITCH WITH BEAM CONTACT PORTION CONTINUOUSLY EXTENDING BETWEEN INPUT AND OUTPUT TERMINAL ELECTRODES

RELATED APPLICATIONS

This application is a continuation of U.S. patent application Ser. No. 17/199,731, filed Mar. 12, 2021, the disclosure of which is hereby incorporated herein by reference in its entirety.

FIELD OF THE DISCLOSURE

The present invention relates to microelectromechanical system (MEMS) switches, systems, and devices. In particular, the present invention relates to a MEMS switch with a beam contact portion continuously extending between input and output terminal electrodes to limit on-state resistance.

BACKGROUND

Microelectromechanical system (MEMS) switches provide high-performance relays that operate across a wide variety of frequency ranges. Unwanted or parasitic resistance may occur in MEMS switches, such as between the input terminal electrode and the output terminal electrode. Such parasitic resistance is undesirable as it results in an electrical loss.

SUMMARY

Embodiments of the disclosure are directed to microelectromechanical system (MEMS) switches with a beam contact portion continuously extending between input and output terminal electrodes. In exemplary aspects disclosed herein, the movable beam includes a body and a contact with more conductivity and stiffness than the body. The contact continuously extends between and electrically couples the contact of the movable beam with the input and output terminal electrodes. Differing materials between the body and the contact allow for inclusion of the mechanical properties of the body (e.g., to reduce mechanical fatigue, creep, etc.) while utilizing the electrical properties of the contact (e.g., to reduce on-state electrical resistance). Accordingly, the MEMS switch provides low resistance loss during an on-state while maintaining high levels of isolation during an off-state.

One embodiment of the disclosure relates to a MEMS switch that includes an input terminal electrode, an output terminal electrode, a pull-down electrode positioned between the input terminal electrode and the output terminal electrode, and a movable beam positioned proximate the input terminal electrode and the output terminal electrode. The movable beam includes a body comprising a first conductivity and a first stiffness and a contact comprising a second conductivity and a second stiffness more than the first conductivity and the first stiffness. The contact is proximate to and continuously extending between the input terminal electrode and the output terminal electrode to limit on-state resistance therebetween. The movable beam is configured to move between an on-state and an off-state. The on-state electrically couples the contact of the movable beam with the input terminal electrode and the output terminal electrode. The off-state electrically isolates the contact of the movable beam from the input terminal electrode and the output terminal electrode.

An additional embodiment of the disclosure relates to a MEMS including a plurality of MEMS switches. Each switch includes an input terminal electrode, an output terminal electrode, a pull-down electrode positioned between the input terminal electrode and the output terminal electrode, and a movable beam positioned proximate the input terminal electrode and the output terminal electrode. The movable beam includes a body comprising a first conductivity and a first stiffness and a contact comprising a second conductivity and a second stiffness more than the first conductivity and the first stiffness. The contact is proximate to and continuously extending between the input terminal electrode and the output terminal electrode to limit on-state resistance therebetween. The movable beam is configured to move between an on-state and an off-state. The on-state electrically couples the contact of the movable beam with the input terminal electrode and the output terminal electrode. The off-state electrically isolates the contact of the movable beam from the input terminal electrode and the output terminal electrode.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It should be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It should also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It should be understood that, although the terms "upper," "lower," "bottom," "intermediate," "middle," "top," and the like may be used herein to describe various elements, these elements should not be limited by these terms. These terms are only used to distinguish one element from another. For example, a first element could be termed an "upper" element and, similarly, a second element could be termed an "upper" element depending on the relative orientations of these elements, without departing from the scope of the present disclosure.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having meanings that are consistent with their meanings in the context of this specification and the relevant art and will not be interpreted in an idealized or overly formal sense unless expressly so defined herein.

Microelectromechanical system (MEMS) technology is currently one of the best available options for the implementation of very high-performance relays that operate from direct current (DC) up to radio frequency and mm-Wave spectrum ranges. The most important figure of merit for such devices is generated from on-state resistance (Ron) and off-state capacitance (Coff). The product of these two quantities (Ron*Coff), measured in seconds, is an indicator of the intrinsic capability of such devices. A smaller Ron*Coff is desired in order to allow the design of relays that provide low loss when the electrical path is closed (on-state) while maintaining high levels of isolation when the electrical path is open (off-state).

Figure 1A:
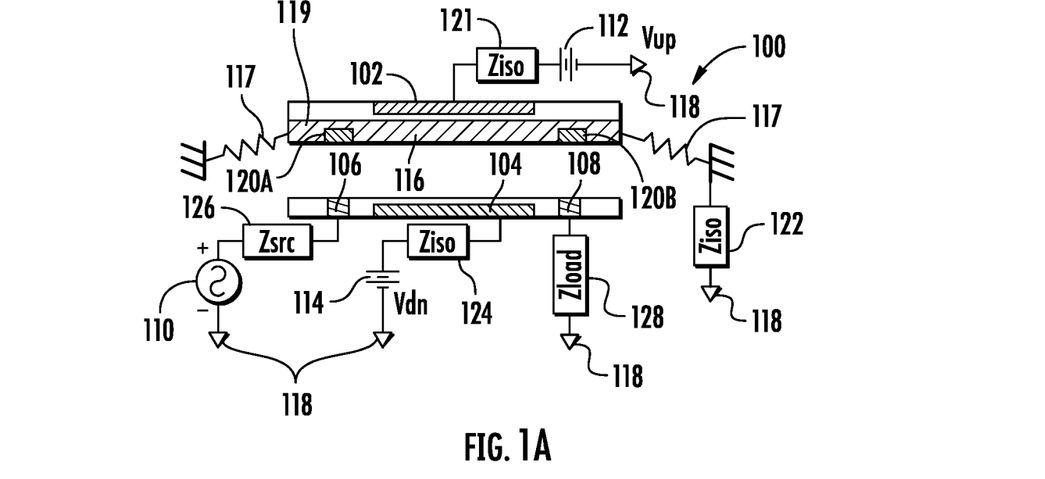
FIG. 1A is a schematic diagram of microelectromechanical system (MEMS) switch in an off-state, including a non-continuous contact extending between terminal electrodes.
Figure 1B:
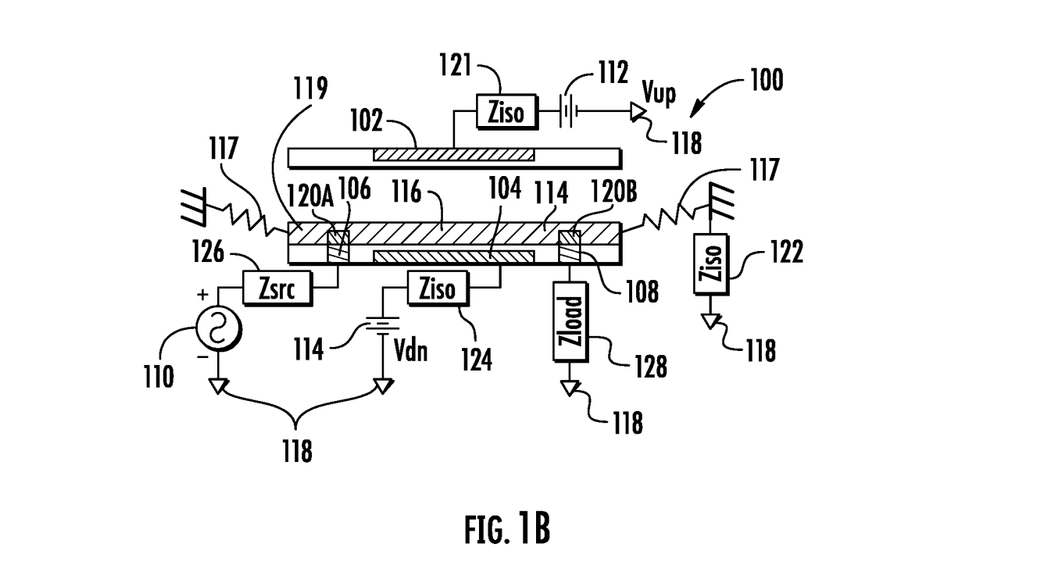
FIG. 1B is a schematic diagram of the MEMS switch of FIG. 1A in an on-state.

FIG. 1A and FIG. 1B are diagrams of a MEMS switch 100 with a pull-up electrode 102 and a pull-down electrode 104 between terminal electrodes 106, 108. In particular, the terminal electrodes 106, 108 include an input terminal electrode 106 (may also be referred to as a first terminal electrode, input electrode, first radio frequency (RF) electrode, etc.), and an output terminal electrode 108 (may also be referred to as a second terminal electrode, output electrode, second RF electrode, etc.). For the sake of completeness, the MEMS switch 100 is connected to a power source 110 coupled to the first terminal electrode 106 (via a power source circuit), a voltage up (Vup) coupling 112 coupled to the pull-up electrode 102, and a voltage down (Vdn) coupling 114 coupled to the pull-down electrode 104.

The MEMS switch 100 (which may also be referred to herein as a MEMS relay, MEMS ohmic switch, etc.) further includes a moveable beam 116 (may also be referred to as a floating beam) mechanically anchored at both ends by flexible anchors 117 (e.g., springs). In this way, the moveable beam 116 is configured to move between a first position (off-state) and a second position (on-state) for up and down electrostatic actuation. The moveable beam 116 is connected to a ground connection 118. The moveable beam 116 further includes a body 119, an input contact 120A proximate the input electrode 106, and an output contact 120B proximate the output electrode 108. In certain embodiments, the moveable beam 116 is coupled to an RF node.

Referring to FIG. 1A, the MEMS switch 100 is in the off-state (which may also be referred to as a pull-up state) where the moveable beam 116 of the MEMS switch 100 is pulled up (by electrostatic forces) toward the pull-up electrode 102. In the first position, the moveable beam 116 is disposed adjacent to the pull-up electrode 102 and spaced from the pull-down electrode 104, the input terminal electrode 106, and the output terminal electrode 108. This spacing thus provides an infinite resistance between the moveable beam 116 and each of the input terminal electrode 106 and the output terminal electrode 108.

Referring to FIG. 1B, the MEMS switch 100 is in the on-state (may also be referred to as a pull-down state), where the movable beam 116 of the MEMS switch 100 is pulled down (by electrostatic forces) towards the pull-down electrode 104. In the second position, the moveable beam 116 is disposed adjacent to the pull-down electrode 104, the input terminal electrode 106, and the output terminal electrode 108 and is spaced from the pull-up electrode 102. In particular, electrical current flows from the input terminal electrode 106, through the input contact 120A, through the moveable beam 116, through the output contact 120B, and to the output terminal electrode 108. The input and output contacts 120A, 120B have a higher conductivity (i.e., lower resistance) than the body 119 of the moveable beam 116. In other words, the electrical flow path includes a parasitic resistance R (e.g., 15-45 Ohms) formed from the electrical current flowing from the input contact 120A to the output contact 120B through the body 119. In certain embodiments, the contact resistance between the input contact 120A and the input terminal electrode 106 and between the output contact 120B and the output terminal electrode 108 is about 15-45 Ohms. Contact resistances are limited by total contact area, roughness of contact surfaces, applied contact forces, etc. It is noted that if the contact resistance and parasitic resistance R are each about 15-45 Ohms, then operating many switches in parallel may provide a total switch-array resistance of 0.5 Ohms.

In certain embodiments, the MEMS switch 100 further includes an up isolation circuit 121 between the pull-up electrode 102 and the Vup coupling 112 (may also be referred to as Vup connection, Vup source, etc.), a second isolation circuit 122 disposed between the moveable beam 116 and electrical ground connection 118, and a down isolation circuit 124 between the pull-down electrode 104 and the Vdn coupling 114 (may also be referred to as Vdn connection, Vdn source, etc.). The isolation circuits 121, 122, 124 isolate the MEMS switch 100 to prevent RF leakage (e.g., through the Vup coupling 112, the Vdn coupling 114, and/or the ground connection 118) by adding electrical impedance at RF leakage points. In certain embodiments, each of the isolation circuits 121, 122, 124 (may be referred to as Ziso) include at least one resistor. The source impedance connected to the MEMS switch 100 is represented by Zsrc 126, and the load impedance connected to the MEMS switch 100 is represented by Zload 128. Additionally, the isolation circuits 121, 124 are utilized to isolate the control voltage sources, such as the Vup coupling 112 and the Vdn coupling 114.

The isolation circuits 121, 122, 124 provide several benefits. The isolation circuits 121, 122, 124 bias the DC potential to allow for electrostatic actuation and further provide a path for transient currents during switching. The components of each of the isolation circuits 121, 122, 124 are chosen such that the resistance levels limit RF leakage while enabling the MEMS switch 100 to function as intended (e.g., movement speed of moveable beam 116, maintain electric potential at the pull-up electrode 102 and pull-down electrode 104 during the switching transients), among other advantages (e.g., accurate engineering of actuation waveforms). In particular, the isolation circuits 121, 122, 124 help maintain RF performance, such as voltage handling, insertion loss, isolation, and linearity.

In certain embodiments, the MEMS switch 100 has an on-resistance of 10 s of Ohm and a very low off-state capacitance Coff, resulting in a Ron*Coff of 25-30 fs. A low on-resistance is achieved by operating many of these small MEMS RF-switch elements in parallel in an array. In this way, an on-resistance of 0.5 Ohms with an off-state capacitance of 50-60 fF can be achieved. However, further reductions can enable an even lower loss and/or a higher operating frequency as telecommunication bands move increasingly toward higher frequencies.

Figure 2A:
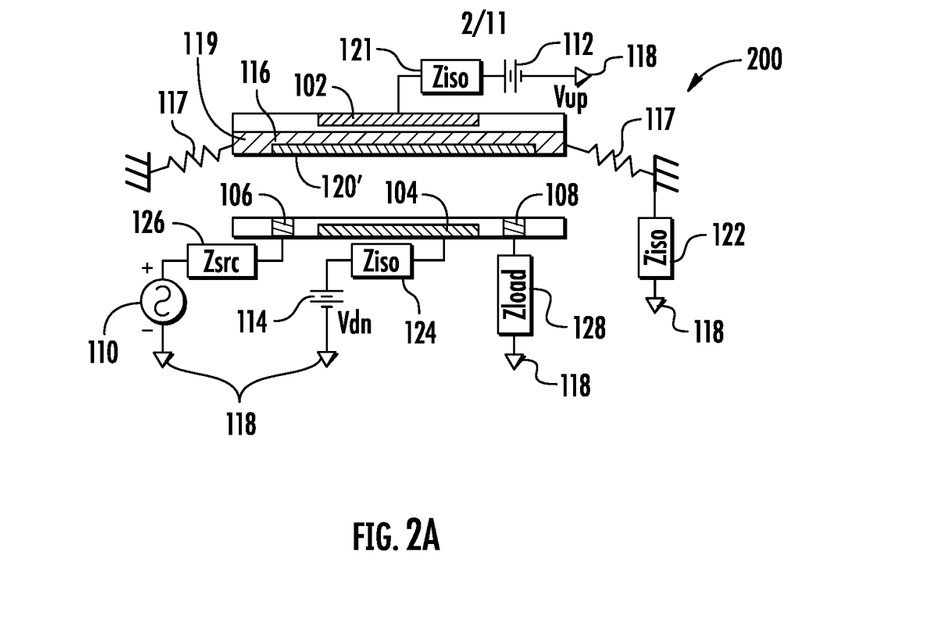
FIG. 2A is a schematic diagram cross-sectional side view of a MEMS switch in an off-state including a pull-up electrode and a continuous contact extending between terminal electrodes.
Figure 2B:
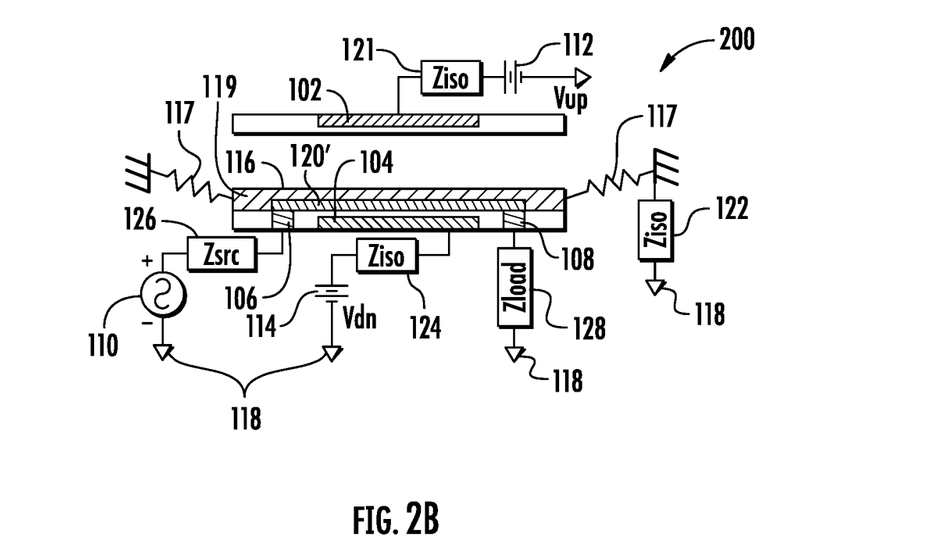
FIG. 2B is a schematic diagram of the MEMS switch of FIG. 2A in an on-state.

FIG. 2A and FIG. 2B are diagrams of a MEMS switch 200 with a single continuous contact 120' extending between the input terminal electrode 106 and the output terminal electrode 108. The MEMS switch 200 includes similar features as those discussed above with reference to FIG. 1A and FIG. 1B, unless otherwise noted. In particular, the MEMS switch 200 includes an input terminal electrode 106, an output terminal electrode 108, a pull-up electrode 102, a pull-down electrode 104 positioned between the input terminal electrode 106 and the output terminal electrode 108, and a movable beam 116. The pull-up electrode 102 is configured to electrically bias the movable beam 116 toward the off-state. In certain embodiments, the pull-up electrode 102 and/or the pull-down electrode 104 includes a plurality of pull-up electrodes 102 and/or a plurality of pull-down electrodes 104. In certain embodiments, the moveable beam 116 further includes a stiffness (e.g., mechanical spring constant) to bias the moveable beam 116 to the off-state away from the input electrode 106, output electrode 108, and pull-down electrode 104. In other words, the moveable beam 116 is mechanically biased toward the off-state.

In certain embodiments, the pull-down electrode 104 is respectively coupled to a down isolation circuit 124 to isolate a lower voltage source from the plurality of pull-down electrodes 104. In certain embodiments, a second isolation circuit 122 is positioned between the movable beam 116 and an electrical common ground connection 118. In certain embodiments, the pull-up electrode 102 is coupled to an up isolation circuit 121 to isolate an upper voltage source from the pull-up electrode 102.

The movable beam 116 is configured to move between an on-state adjacent to the plurality of pull-down electrodes 104 to electrically couple the input terminal electrode 106 and the output terminal electrode 108 to the movable beam 116, and an off-state away from the plurality of pull-down electrodes 104 to electrically isolate the input terminal electrode 106 and the output terminal electrode 108 from the movable beam 116.

Instead of using multiple contacts, the MEMS switch 200 utilizes the one continuous contact 120' that continuously extends between the input terminal electrode 106 and the output terminal electrode 108. The moveable beam 116 includes a body 119 and the contact 120' positioned toward a bottom of the body 119 extending between the input terminal electrode 106 and the output terminal electrode 108. In certain embodiments, the contact 120' is embedded within the body 119. In certain embodiments, portions of the contact 120' are exposed and portions of the contact 120' are covered (e.g., by a dielectric film).

Electrical current flows from the input terminal electrode 106 through the contact 120' to the output terminal electrode 108. The contact 120' has a higher conductivity (i.e., lower resistance) than the body 119 of the moveable beam 116. In other words, the electrical flow path includes a resistance R' formed from the electrical current flowing through the contact 120'. However, the resistance R' of the contact 120' is less than a resistance R of the body 119. In certain embodiments, the contact resistance between the contact 120' and each of the input terminal electrode 106 and the output terminal electrode 108 is about 15-45 Ohms. In certain embodiments, the on-state resistance reduces from 0.5 Ohms to 0.35 Ohm, resulting in a 30% improvement. Accordingly, the contact 120' has reduced the parasitic resistance R' without increasing any contact resistance.

It is also noted that an electrical current may also flow through the body 119, but that the electrical current that flows through the body 119 is in parallel with the electrical current that flows through the contact 120'. The contact 120' of the moveable beam 116 provides higher conductivity (i.e., lower resistance) than the body 119, but may also be stiffer than the body 119. A thickness t of the contact 120' can be adjusted based on the mechanical and/or electrical requirements of the MEMS switch 200. In certain embodiments, the thickness t is between about 30 to 80 nm. Further, the body 119 may be altered to compensate for the additional stiffness and/or weight of the larger surface area of the contact 120'. For example, the body 119 may require adjusted stress levels applied during deposition to straighten out the body 119 to compensate for the contact 120' and prevent any mechanical deflection or bowing.

The contact 120' further decreases the on-resistance of the MEMS switch by 25-30% without sacrificing the off-state capacitance, thus providing further reduction of the Ron*Coff.

Although described above as a single switch, other arrangements may be utilized. Multiple relays may be included together into one arrangement. In some non-limiting embodiments, four relays may be provided.

Accordingly, disclosed herein is a MEMS switch 200 with a movable beam 116 positioned proximate to the input terminal electrode 106 and the output terminal electrode 108. The movable beam 116 includes a body 119 having a first conductivity and first stiffness, and a contact 120' having a second conductivity and a second stiffness more than the first conductivity and the first stiffness. The contact 120' is proximate to and continuously extending between the input terminal electrode 106 and the output terminal electrode 108, which limits on-state resistance therebetween. The movable beam 116 is configured to move between an on-state and an off-state. In the on-state, the movable beam 116 electrically couples the contact 120' of the movable beam 116 with the input terminal electrode 106 and the output terminal electrode 108. In the off-state, the movable beam 116 electrically isolates the contact 120' of the movable beam 116 from the input terminal electrode 106 and the output terminal electrode 108.

Figure 3A:
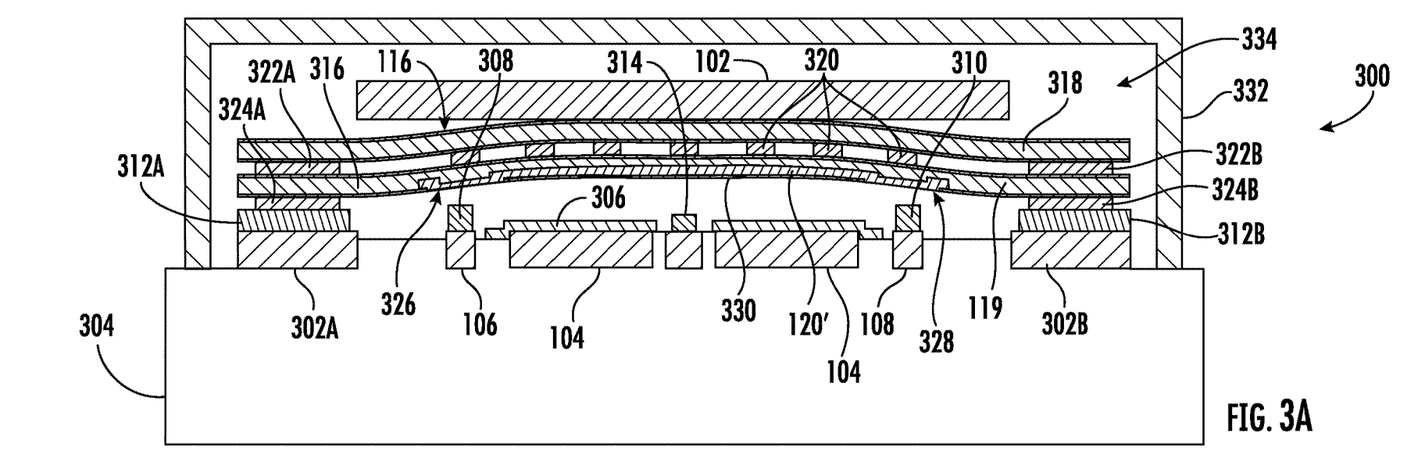
FIG. 3A is a cross-sectional side view of one embodiment of the MEMS switch of FIG. 2A and FIG. 2B in an off-state.
Figure 3B:
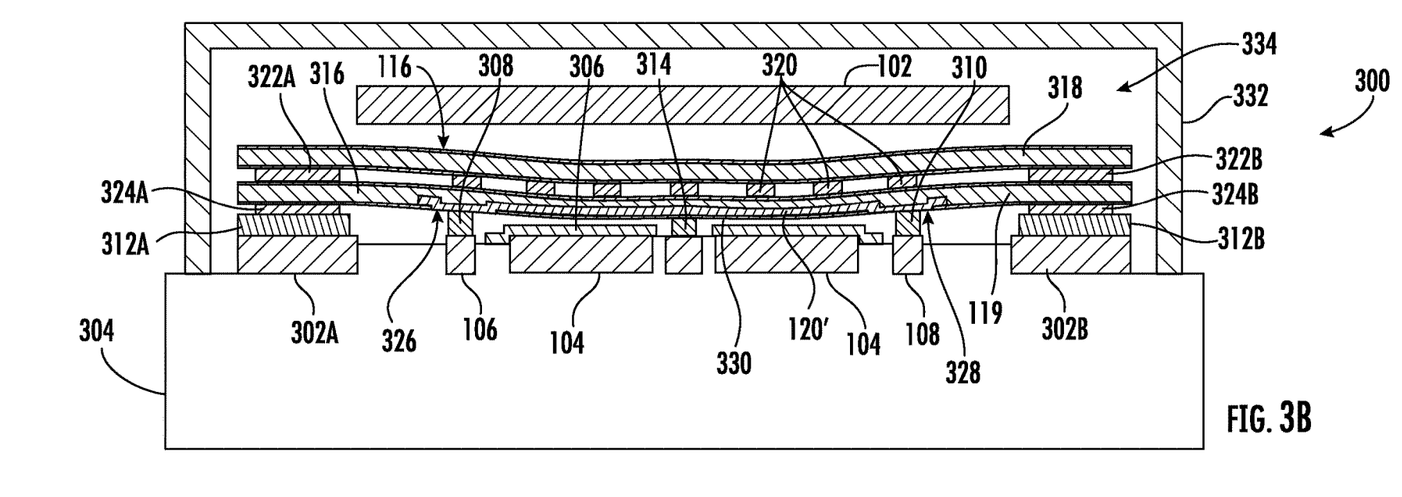
FIG. 3B is a cross-sectional side view of the MEMS switch of FIG. 3A in an on-state.

FIG. 3A and FIG. 3B are views of one embodiment of the MEMS switch 200 of FIG. 2A and FIG. 2C. The MEMS ohmic switch 300 includes an input terminal electrode 106, an output terminal electrode 108, a pull-up electrode 102, a pull-down electrode 104 positioned between the input terminal electrode 106 and the output terminal electrode 108, a movable beam 116, and anchor electrodes 302A, 302B. The MEMS switch 300 further includes a substrate 304 with the input terminal electrode 106, the output terminal electrode 108, the pull-down electrode 104, and the anchor electrodes 302A, 302B mounted on the substrate 304.

The pull-down electrode 104 is covered with a dielectric layer 306 to avoid a short-circuit between the movable beam 116 and the pull-down electrode 104 in the on-state. Suitable materials for the dielectric layer 306 include silicon-based materials such as silicon-oxide, silicon-dioxide, silicon-nitride, and silicon-oxynitride. The thickness of the dielectric layer 306 is typically in the range of 50 nm to 150 nm to limit the electric field in the dielectric layer 306.

On top of the input terminal electrode 106 is the input terminal contact 308 (may also be referred to as an input RF contact), and on top of the output terminal electrode 108 is the output terminal contact 310 (may also be referred to as an output RF contact). The movable beam 116 forms an ohmic contact with the input terminal electrode 106 and the output terminal electrode 108 in the pull-down state. In particular, the moveable beam 116 includes a body 119 with a contact 120' continuously extending between the input terminal electrode 106 and the output terminal electrode 108.

On top of the anchor electrodes 302A, 302B are anchor contacts 312A, 312B, to which the movable beam 116 is anchored. Suitable materials used for the contacts 120', 308, 310, 312A, 312B include Ti, TiN, TiAl, TiAlN, AlN, Al, W, Pt, Ir, Rh, Ru, RuO2, ITO, and Mo and combinations thereof.

In certain embodiments, the MEMS switch 300 includes a center stopper 314 (e.g., positioned on the dielectric layer 306). In certain embodiments, suitable materials that may be used for the center stopper 314 include Ti, TiN, TiAl, TiAlN, AlN, Al, W, Pt, Ir, Rh, Ru, RuO2, ITO, Mo, and/or silicon-based dielectric materials such as silicon oxide, silicon-dioxide, silicon-nitride, and silicon-oxynitride and combinations thereof.

The movable beam 116 (which may also be referred to as a switching element, MEMS bridge, etc.) includes a lower conductive layer 316 and an upper conductive layer 318, which are joined together using an array of vias 320. Opposing ends of the upper conductive layer 318 are anchored to opposing ends of the lower conductive layer 316 by vias 322A, 322B. Opposing ends of the lower conductive layer 316 of the moveable beam 116 are anchored to the anchor contacts 312A, 312B by vias 324A, 324B, which provide low compliance to permit operating voltages (e.g., 25V to 40V) to pull the moveable beam 116 in contact with the terminal contacts 308, 310 and the center stopper 314. This allows for a cheap integration of a CMOS (complementary metal-oxide-semiconductor) controller with a charge-pump to generate the voltages to drive the MEMS switch 300. In other words, ends of the movable beam 116 are mounted to the substrate 304 such that the movable beam 116 is suspended above the input terminal electrode 106, the output terminal electrode 108, and the pull-down electrode 104 in the off-state.

The lower conductive layer 316 includes the contact 120' embedded within the body 119 at a bottom thereof. The contact 120' includes exposed input portions 326 aligned with the input terminal electrode 106, exposed output portions 328 aligned with the output terminal electrode 108, and a covered portion 330 therebetween.

The body 119 of the moveable beam 116 is configured for mechanical properties that allow for stable mechanical operation over many cycle-events (and to avoid suffering from mechanical fatigue or creep). For example, in certain embodiments, the body 119 of the moveable beam 116 includes TiAl and/or TiAlN, etc.

The contact 120' of the moveable beam 116 includes a corrosion-resistant metal that provides good electrical contact resistance. For example, in certain embodiments, the contact 120' of the moveable beam 116 includes Ruthenium, Ruthenium-oxide, platinum, and/or gold, etc.

FIG. 3A illustrates the MEMS switch 300 in an off-state with the pull-up electrode 102 drawing the moveable beam 116 upward toward the pull-up electrode 102 and away from the pull-down electrode 104, the input electrode 106, and the output electrode 108. FIG. 3B illustrates the MEMS switch 300 in an on-state with the pull-down electrode 104 drawing the moveable beam 116 downward toward the pull-down electrode 104 and away from the pull-up electrode 102. Current that was injected from the input terminal contact 308 into the moveable beam 116 when the MEMS switch 300 is actuated down flows out through the moveable beam 116 and the output terminal contact 310. The thicknesses of the terminal contacts 308, 310 and the center stopper 314 is set such that the center stopper 314 is engaged first upon pull-down actuation.

In certain embodiments, the MEMS switch 300 includes a cover 332 mounted to the substrate 304 and defines a cavity 334 between the cover 332 and the substrate 304. The movable beam 116 is positioned within the cavity 332.

Figure 4A:
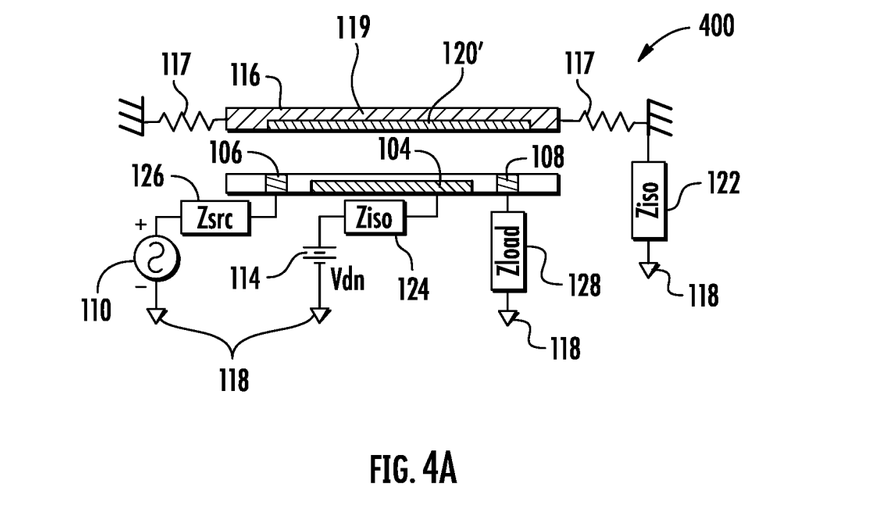
FIG. 4A is a schematic diagram of a MEMS switch in an off-state including a continuous contact extending between the terminal electrodes and devoid of a pull-up electrode.
Figure 4B:
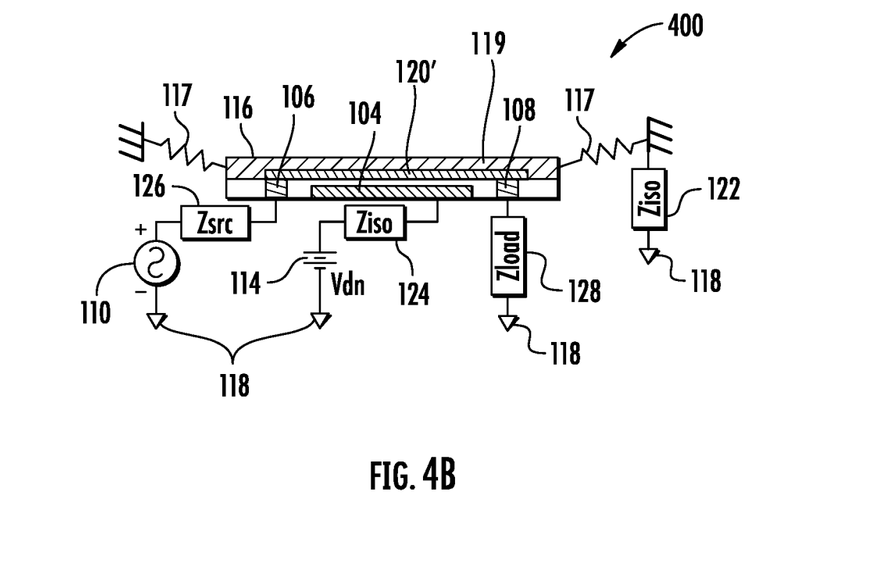
FIG. 4B is a schematic diagram of the MEMS switch of FIG. 4A in an on-state.

FIG. 4A and FIG. 4B illustrate a MEMS switch 400 including the pull-down electrodes 104 between the terminal electrodes 106, 108 and is devoid of a pull-up electrode 102.

The MEMS switch 400 is similar to the MEMS switch 200 of FIGS. 2A-2C except where otherwise noted. The moveable beam 116 includes a stiffness (e.g., mechanical spring constant) to bias the moveable beam 116 to the off-state away from the input electrode 106, the output electrode 108, and the pull-down electrode 104 (without the use of a pull-up electrode). Accordingly, in the on-state, the moveable beam 116 bends toward the pull-down electrode 104, and when voltage from the Vdn coupling 114 is cut off, the moveable beam 116 mechanically returns to the off-state. In other words, the moveable beam 116 is mechanically biased toward the off-state.

Figure 5A:
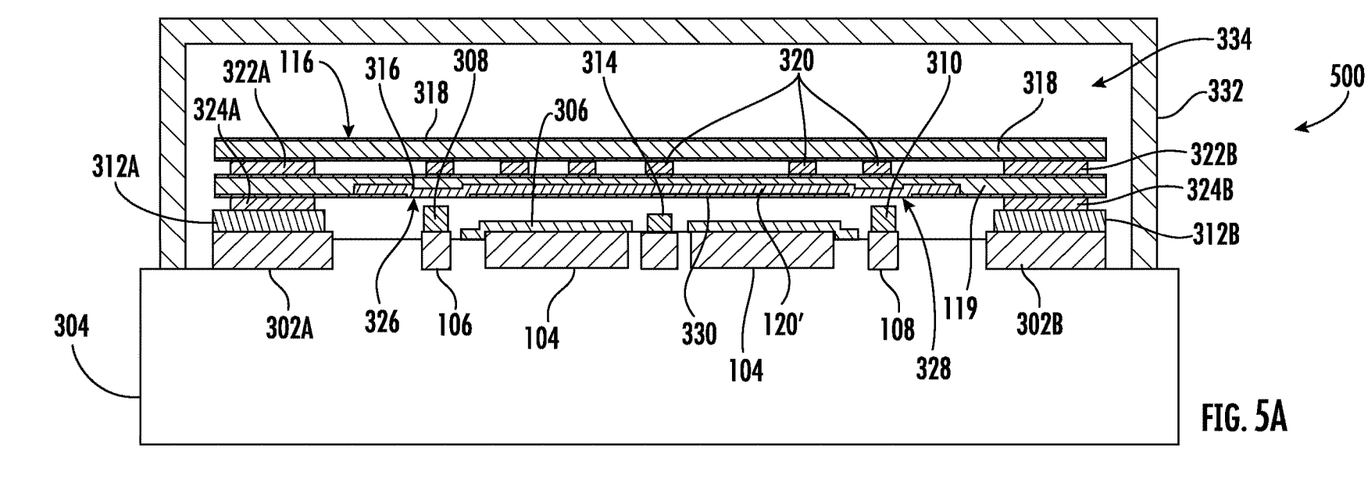
FIG. 5A is a cross-sectional side view of one embodiment of the MEMS switch of FIG. 4A and FIG. 4B in an off-state.
Figure 5B:
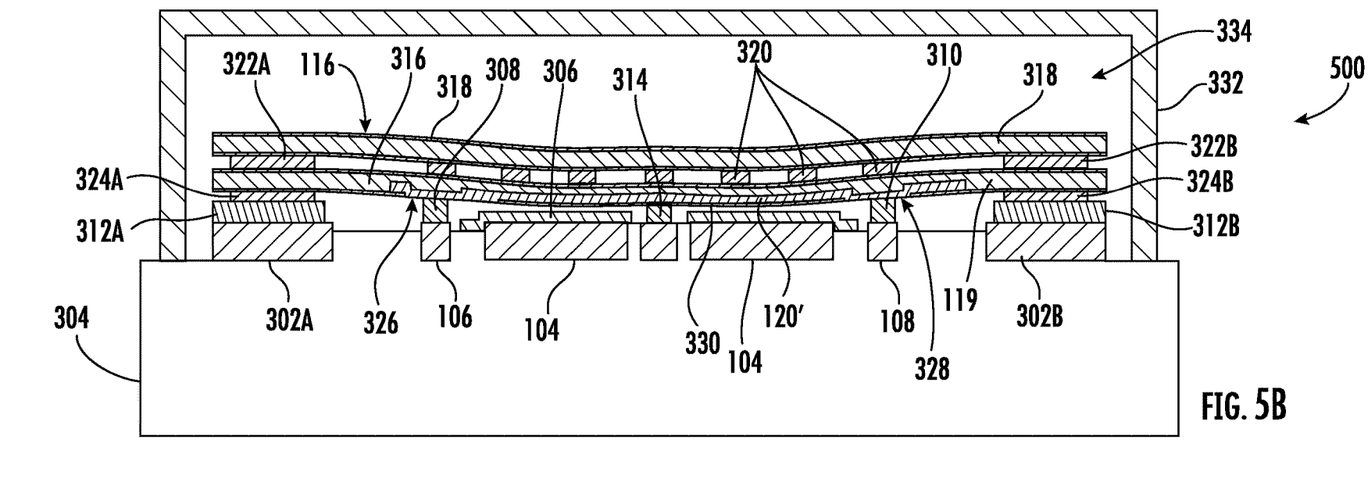
FIG. 5B is a cross-sectional side view of the MEMS switch of FIG. 5A in an on-state.

FIG. 5A and FIG. 5B are cross-sectional side views of one embodiment of the MEMS switch 400 of FIG. 4A and FIG. 4B in an off-state and an on-state, respectively. The MEMS switch 500 is similar to the MEMS switch 300 of FIG. 3A and FIG. 3B, except where otherwise noted. As similarly noted in FIG. 4A and FIG. 4B, the MEMS switch 500 is devoid of the pull-up electrode 102. The moveable beam 116 includes a stiffness to bias the moveable beam 116 to the off-state away from the input electrode 106, the output electrode 108, and the pull-down electrode 104.

Figure 6:
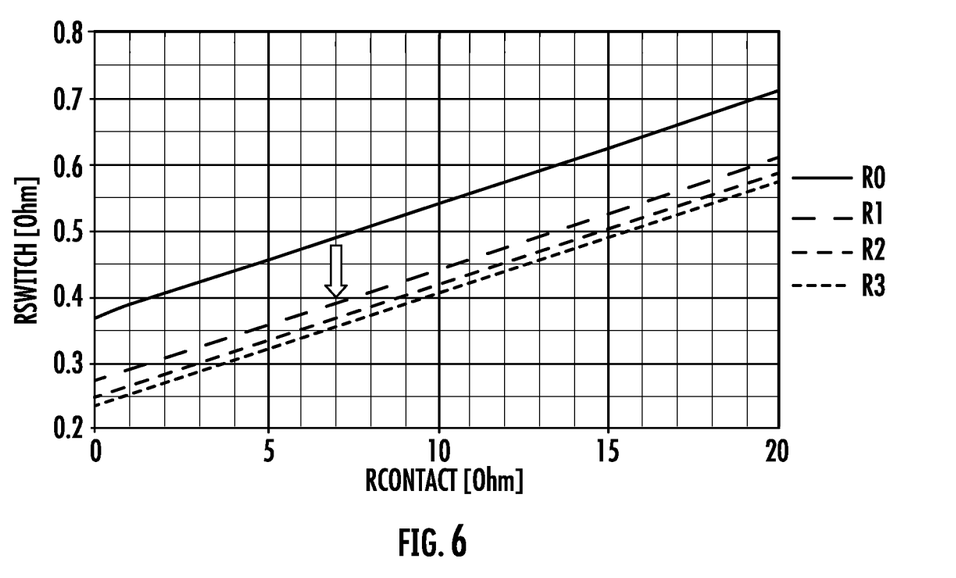
FIG. 6 is a graph illustrating resistance reduction using the continuous contact of the MEMS switch of FIGS. 5A-5B.

FIG. 6 is a graph illustrating resistance reduction using the continuous contact of the MEMS switch 500 of FIG. 5A and FIG. 5B. As illustrated, in certain embodiments, use of the continuous contact reduces the on-switch resistance compared to a beam without the continuous contact (R0) by 0.1 to 0.15 Ohms. A typical beam-contact layer thickness of 30 to 80 nm is used. The effect of an increased thickness of the beam-contact layer is shown for three different thicknesses (R1-R3). The thicker the layer is, the more the on-resistance is reduced (e.g., resulting in a Ron improvement of 0.1-0.15 Ohm). The added benefit of the lower parasitic resistance is that less power will be dissipated inside the moveable beam 116, resulting in less temperature rise, which, in turn, results in a more stable mechanical performance. Moreover, lower dissipated power and better thermal conductivity of the moveable beam 116 can have a positive impact on the linearity of the ON-state switch, lowering intermodulation and harmonic distortion levels.

FIGS. 7A-7D are diagrams illustrating different embodiments of the contact 120', which may be used depending on electrical and/or mechanical requirements. The MEMS switch includes a plurality of input terminal electrodes 106(1), 106(2) (referred to generally as input terminal electrodes 106) and a plurality of output terminal electrodes 108(1), 108(2) (referred to generally as output terminal electrodes 108). The input terminal electrodes 106 and the output terminal electrodes 108 are positioned in a grid to stabilize the moveable beam 116 upon contact with the input terminal electrodes 106 and the output terminal electrodes 108. In other words, the input terminal electrodes 106 are aligned along a width W0, and the output terminal electrodes 108 are aligned along the width W0. Of course, fewer or more of the input terminal electrodes 106 and/or the output terminal electrodes 108 may be used.

Figure 7A:
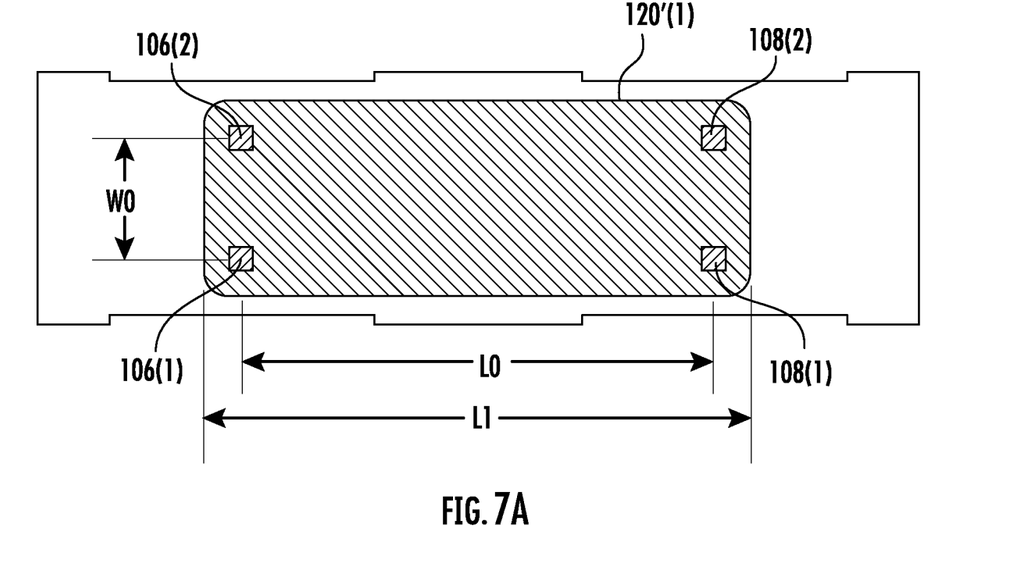
FIG. 7A is a diagram of one embodiment of the continuous contact of the MEMS switch of FIG. 3A and FIG. 3B or FIG. 6A and FIG. 6B of a first length.

Referring to FIG. 7A, a contact 120'(1) is of a generally rectangular shape of a first length L1. The contact 120'(1) continuously extends over each of the plurality of input terminal electrodes 106 and the plurality of output terminal electrodes 108.

Figure 7B:
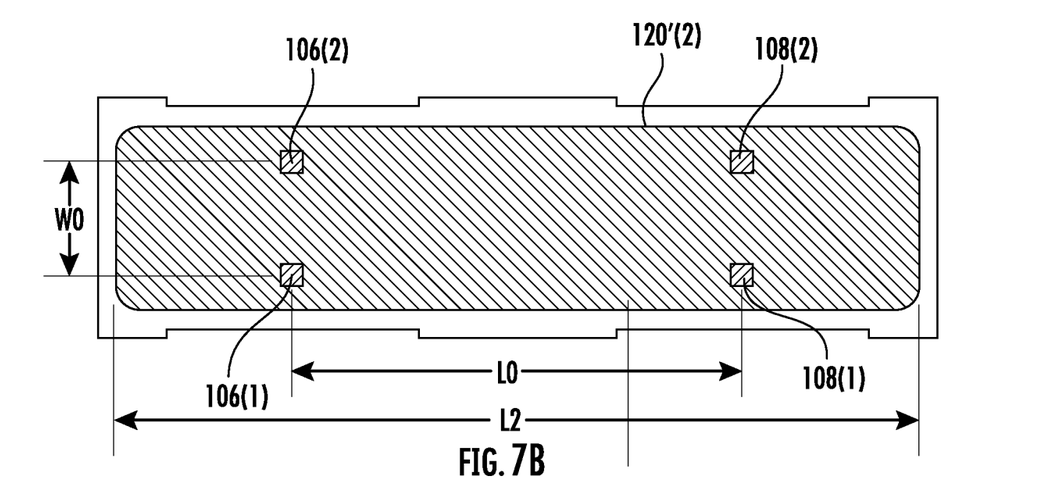
FIG. 7B is another embodiment of the continuous contact of the MEMS switch of FIG. 2A and FIG. 2B of a second length greater than the first length.

Referring to FIG. 7B, a contact 120'(2) is of a generally rectangular shape of a second length L2. The contact 120'(2) continuously extends over each of the plurality of input terminal electrodes 106 and the plurality of output terminal electrodes 108. However, the contact 120'(2) extends farther past the input terminal electrodes 106 and the output terminal electrodes 108. In certain embodiments, the length L2 of the contact 120'(2) is 1-50% (e.g., 10-50%, 20-40%, 20-30%, etc.) more than a length L0 between the set of input terminal electrodes 106 and the set of output terminal electrodes 108. In this way, the length L2 of the contact 120'(2) can be adjusted depending on the stiffness requirements of the moveable beam 116. In particular, a longer contact 120'(2) would result in a stiffer moveable beam 116 (assuming constant thickness).

Figure 7C:
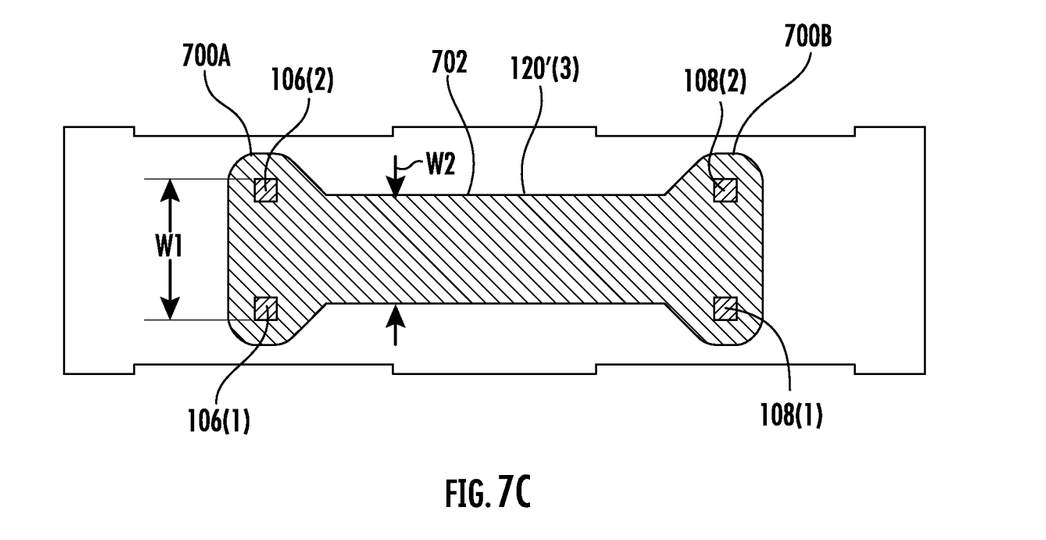
FIG. 7C is another embodiment of the continuous contact of the MEMS switch of FIG. 2A and FIG. 2B with a narrow middle.

Referring to FIG. 7C, the contact 120'(3) includes end portions 700A, 700B that are wider at a first width W1 than a middle portion 702 of the contact 120'(3) at a second width W2. Narrowing the middle portion 702 provides a continuous electrical path between the input terminal electrodes 106 and the output terminal electrodes 108 while also reducing a stiffness and/or weight of the contact 120'(3). In certain embodiments, the width W1 of the end portions 700A, 700B is 1-100% (e.g., 1-50%, 10-50%, 20-80%, 30-60%, etc.) more than the width W2 of the middle portion 702.

Figure 7D:
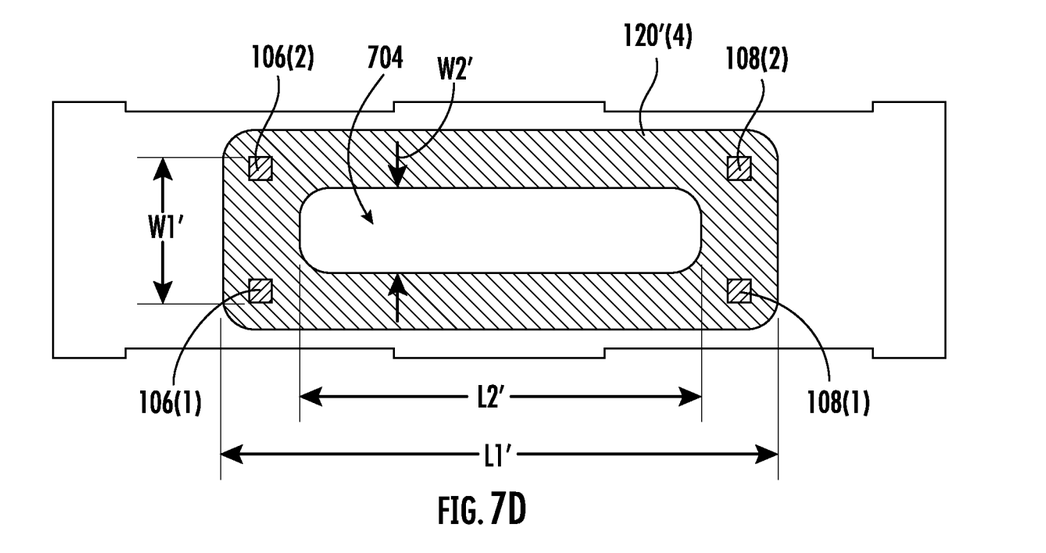
FIG. 7D is another embodiment of the continuous contact of the MEMS switch of FIG. 2A and FIG. 2B defining a central aperture.

Referring to FIG. 7D, a contact 120'(4) defines a central aperture 704. Similar to the embodiments discussed above, such a configuration provides a continuous electrical path between the input terminal electrodes 106 and the output terminal electrodes 108 while also reducing a stiffness and/or weight of the contact 120'(4). In certain embodiments, a width W1' of the contact 120'(4) is 1-100% (e.g., 1-50%, 10-50%, 20-80%, 30-60%, etc.) more than a width W2' of the central aperture 704. Further, in certain embodiments, a length L1' of the contact 120'(4) is 1-100% (e.g., 1-50%, 10-50%, 20-80%, 30-60%, etc.) more than a length L2' of the central aperture 704.

Figure 8:
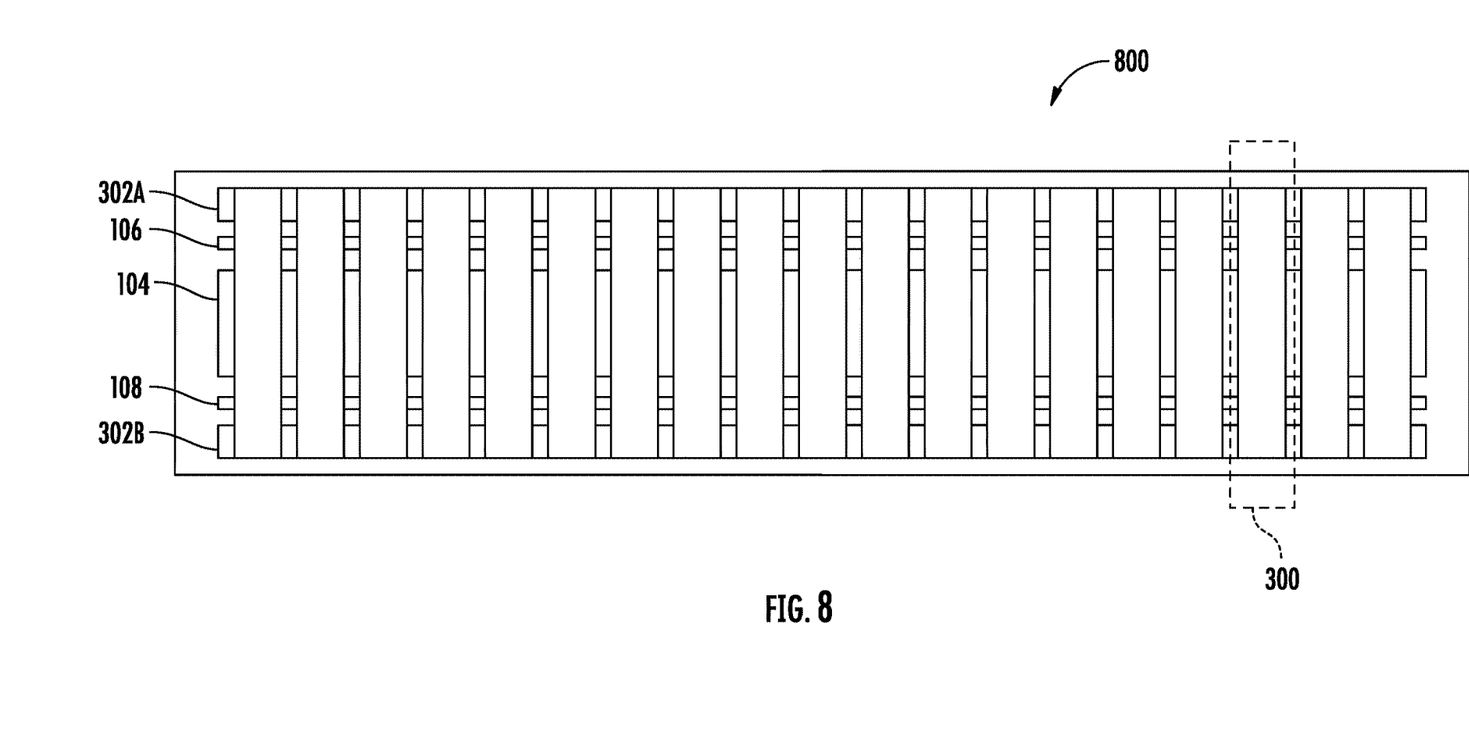
FIG. 8 is a schematic top view of a switch cell containing a number of MEMS switches.

FIG. 8 is a schematic top view of a switch cell 800 containing a number of MEMS switches 300. All of the MEMS switches 300 in the cell 800 are turned on simultaneously by applying a sufficiently high voltage to the pull-down electrode 104. Although the MEMS switches 300 are illustrated, a similar configuration could be used for any of the MEMS switches disclosed herein.

Those skilled in the art will recognize improvements and modifications to the preferred embodiments of the present disclosure. All such improvements and modifications are considered within the scope of the concepts disclosed herein and the claims that follow.

What is claimed is:

1. A microelectromechanical system (MEMS) switch, comprising:
   an input terminal electrode;
   an output terminal electrode;
   a pull-down electrode positioned between the input terminal electrode and the output terminal electrode;
   a movable beam positioned proximate the input terminal electrode and the output terminal electrode, the movable beam comprising:
   an upper conductive layer;
   a lower conductive layer having a first conductivity;
   a contact incorporated into the lower conductive layer, wherein:
      the contact has a second conductivity that is more than the first conductivity; and
      the contact is configured, with respect to the input terminal electrode and the output terminal electrode, to limit on-state resistance between the input terminal electrode and the output terminal electrode; and
   an array of vias that join the upper conductive layer to the lower conductive layer; and the movable beam is configured to move between:
an on-state that electrically couples the contact of the movable beam with the input terminal electrode and the output terminal electrode; and
an off-state that electrically isolates the contact of the movable beam from the input terminal electrode and the output terminal electrode.

2. The MEMS switch of claim 1, wherein the input terminal electrode comprises an input radio frequency (RF) electrode, and the output terminal electrode comprises an output RF electrode.

3. The MEMS switch of claim 1, wherein the movable beam is coupled to a radio frequency (RF) node.

4. The MEMS switch of claim 1, wherein:
the upper conductive layer comprises at least one of TiAl or TiAlN; and
the lower conductive layer comprises at least one of TiAl or TiAlN.

5. The MEMS switch of claim 1, wherein the contact comprises at least one of ruthenium, ruthenium oxide, platinum, or gold.

6. The MEMS switch of claim 1, wherein the contact has a thickness between about 30 to 80 nm.

7. The MEMS switch of claim 1, wherein a length of the contact is between 1% to 50% longer than a length between the input terminal electrode and the output terminal electrode.

8. The MEMS switch of claim 1, wherein end portions of the contact are wider than a middle portion of the contact.

9. The MEMS switch of claim 1, wherein the contact defines an aperture.

10. The MEMS switch of claim 1, wherein:
the input terminal electrode comprises a plurality of input terminal electrodes;
the output terminal electrode comprises a plurality of output terminal electrodes; and
wherein the contact continuously extends over each of the plurality of input terminal electrodes and the plurality of output terminal electrodes.

11. The MEMS switch of claim 1, wherein the movable beam is mechanically biased toward the off-state.

12. The MEMS switch of claim 1, further comprising a pull-up electrode configured to electrically bias the movable beam toward the off-state.

13. The MEMS switch of claim 1:
further comprising a substrate;
wherein the input terminal electrode, the output terminal electrode, and the pull-down electrode are mounted on the substrate; and
wherein ends of the movable beam are mounted to the substrate such that the movable beam is suspended above the input terminal electrode, the output terminal electrode, and the pull-down electrode in the off-state.

14. The MEMS switch of claim 13:
further comprising a cover mounted to the substrate and defining a cavity between the cover and the substrate; and
wherein the movable beam is positioned within the cavity.

15. A microelectromechanical system (MEMS) device, comprising:
a plurality of MEMS switches, each switch comprising:
an input terminal electrode;
an output terminal electrode;
a pull-down electrode positioned between the input terminal electrode and the output terminal electrode;
a movable beam positioned proximate the input terminal electrode and the output terminal electrode, the movable beam comprising:
an upper conductive layer;
a lower conductive layer having a first conductivity;
an array of vias that join the upper conductive layer to the lower conductive layer; and
a contact incorporated into the lower conductive layer, the contact having a second conductivity more than the first conductivity, the contact proximate to and extending between the input terminal electrode and the output terminal electrode to limit on-state resistance therebetween; and
the movable beam configured to move between:
an on-state that electrically couples the contact of the movable beam with the input terminal electrode and the output terminal electrode; and
an off-state that electrically isolates the contact of the movable beam from the input terminal electrode and the output terminal electrode.

16. The MEMS device of claim 15, wherein for each MEMS switch, the upper conductive layer comprises at least one of TiAl or TiAlN, the lower conductive layer comprises at least one of TiAl or TiAlN, and the contact comprises at least one of ruthenium, ruthenium oxide, platinum, or gold.

17. The MEMS device of claim 15, wherein for each MEMS switch, the contact has a thickness between about 30 to 80 nm.

18. The MEMS device of claim 15, wherein for each MEMS switch, a length of the contact is between 1% to 50% longer than a length between the input terminal electrode and the output terminal electrode.

19. The MEMS device of claim 15, wherein for each MEMS switch, end portions of the contact are wider than a middle portion of the contact.

20. The MEMS device of claim 15, wherein for each MEMS switch, the contact defines an aperture.

* * * * *